United States Patent
Siekman et al.

(10) Patent No.: US 12,260,416 B2
(45) Date of Patent: Mar. 25, 2025

(54) AGNOSTIC IMAGE DIGITIZER TO AUTOMATE COMPLIANCE FILINGS

(71) Applicant: Bank of America Corporation, Charlotte, NC (US)

(72) Inventors: James Siekman, Charlotte, NC (US); Aubrey Breon Farrar, Sr., Waldorf, MD (US); Mohamed Faris Khaleeli, Charlotte, NC (US); Patricia Ann Albritton, Charlotte, NC (US); Sheila Page, Charlotte, NC (US); Mark Alan Odiorne, Waxhaw, NC (US); Marcus R. Matos, Richardson, TX (US)

(73) Assignee: Bank of America Corporation, Charlotte, NC (US)

( * ) Notice: Subject to any disclaimer, the term of this patent is extended or adjusted under 35 U.S.C. 154(b) by 370 days.

(21) Appl. No.: 17/874,720

(22) Filed: Jul. 27, 2022

(65) Prior Publication Data
US 2024/0037565 A1    Feb. 1, 2024

(51) Int. Cl.
*G06Q 30/018* (2023.01)
*G06F 16/23* (2019.01)

(52) U.S. Cl.
CPC ....... *G06Q 30/018* (2013.01); *G06F 16/2365* (2019.01)

(58) Field of Classification Search
CPC .......................... G06Q 30/018; G06F 16/2365
See application file for complete search history.

(56) References Cited

U.S. PATENT DOCUMENTS

| | | | | |
|---|---|---|---|---|
| 7,467,107 B1 * | 12/2008 | Mulligan, Jr. | ......... | G06Q 40/06 705/37 |
| 7,724,249 B1 * | 5/2010 | Horikawa | ............. | G06F 40/174 345/531 |
| 8,145,574 B1 * | 3/2012 | Hancock | ................ | G06Q 50/26 705/308 |
| 8,601,367 B1 * | 12/2013 | Ritz | ....................... | G06Q 40/00 715/234 |
| 8,799,243 B1 * | 8/2014 | Havlik | ................ | G06Q 10/105 707/694 |
| 8,813,178 B1 * | 8/2014 | Khanna | .................. | G06Q 10/10 726/8 |

(Continued)

*Primary Examiner* — Charles Rones
*Assistant Examiner* — Huen Wong
(74) *Attorney, Agent, or Firm* — Weiss & Arons LLP

(57) ABSTRACT

Methods for automating a submission of a compliance filing from an organization to a regulatory authority. Methods may include enhancing compatibility of a document submitted by an entity to an organization with the latter's database to facilitate automated submission of a compliance document. Methods may include receiving a populated document in a first format from the entity, using a processor to digitize the document into a digital format, such as bytes, and further into a second format, where the first format may not be compatible with the database and the second format may be compatible with the database. Methods may include updating the database with data from the document. Methods may include using the processor to run a statistical model to determine an appropriate compliance filing relating to change in information about the entity, to populate the compliance filing, and to submit the completed compliance filing with the regulatory authority.

14 Claims, 11 Drawing Sheets

(56) References Cited

U.S. PATENT DOCUMENTS

| | | | |
|---|---|---|---|
| 8,977,613 B1* | 3/2015 | Cooke | G06F 3/04842 |
| | | | 707/754 |
| 9,412,017 B1* | 8/2016 | Huang | H04N 23/60 |
| 10,873,456 B1* | 12/2020 | Dods | G06N 3/045 |
| 11,367,139 B2* | 6/2022 | Cunningham | G06Q 10/04 |
| 11,868,400 B1* | 1/2024 | Palazzo | G06F 40/143 |
| 2002/0069224 A1* | 6/2002 | Asai | G06F 16/88 |
| | | | 715/239 |
| 2003/0120578 A1* | 6/2003 | Newman | G06Q 40/06 |
| | | | 705/36 R |
| 2003/0149935 A1* | 8/2003 | Takizawa | G06F 40/177 |
| | | | 715/239 |
| 2004/0098666 A1* | 5/2004 | Smith, II | G06Q 50/18 |
| | | | 715/205 |
| 2004/0193634 A1* | 9/2004 | Goodlett | G06Q 10/06 |
| | | | 707/999.102 |
| 2006/0041492 A1* | 2/2006 | Takahashi | G06Q 40/00 |
| | | | 705/35 |
| 2007/0078877 A1* | 4/2007 | Ungar | G06F 40/143 |
| 2008/0262883 A1* | 10/2008 | Weiss | G06Q 30/018 |
| | | | 705/7.42 |
| 2008/0262953 A1* | 10/2008 | Anderson | G06Q 40/12 |
| | | | 705/35 |
| 2009/0070253 A1* | 3/2009 | Gavin | G06Q 40/08 |
| | | | 705/38 |
| 2009/0119191 A1* | 5/2009 | Stuart | G06Q 40/00 |
| | | | 705/30 |
| 2010/0031141 A1* | 2/2010 | Summers | G06F 16/832 |
| | | | 715/239 |
| 2010/0145904 A1* | 6/2010 | Riviello | G06F 16/93 |
| | | | 709/206 |
| 2011/0251951 A1* | 10/2011 | Kolkowitz | G06Q 40/02 |
| | | | 705/39 |
| 2013/0111335 A1* | 5/2013 | Tse | G06F 3/1208 |
| | | | 715/255 |
| 2013/0340032 A1* | 12/2013 | Shankar | H04L 63/20 |
| | | | 726/1 |
| 2014/0114823 A1* | 4/2014 | Pai | G06Q 40/123 |
| | | | 705/31 |
| 2015/0100594 A1* | 4/2015 | Hess | G06Q 10/10 |
| | | | 707/755 |
| 2016/0063421 A1* | 3/2016 | Singh | G06Q 10/06316 |
| | | | 705/7.26 |
| 2016/0092413 A1* | 3/2016 | DeGeest | G06F 40/194 |
| | | | 715/234 |
| 2016/0225017 A1* | 8/2016 | Wong | G06Q 10/067 |
| 2019/0164231 A1* | 5/2019 | Tang | G06Q 40/12 |
| 2019/0230088 A1* | 7/2019 | Rice | G06F 21/604 |
| 2020/0167869 A1* | 5/2020 | Magdelinic | G06Q 30/0206 |
| 2020/0258147 A1* | 8/2020 | Song | G06Q 50/265 |
| 2020/0265520 A1* | 8/2020 | Cunningham | G06Q 10/067 |
| 2021/0146161 A1* | 5/2021 | Sintay | G16H 40/20 |
| 2021/0201412 A1* | 7/2021 | Goh | G06Q 40/02 |
| 2021/0279212 A1* | 9/2021 | Kazmi | G06F 16/211 |
| 2021/0287297 A1* | 9/2021 | Hayward | G10L 15/26 |
| 2022/0012357 A1* | 1/2022 | Rajeev | G06F 40/279 |
| 2022/0019671 A1* | 1/2022 | Boone | H04L 67/306 |
| 2022/0129816 A1* | 4/2022 | Ralhan | G06F 40/216 |
| 2023/0102198 A1* | 3/2023 | Matias | G06F 40/131 |
| | | | 706/25 |
| 2023/0237409 A1* | 7/2023 | Mallikarjun | G06Q 10/06375 |
| | | | 705/7.37 |
| 2023/0269301 A1* | 8/2023 | Runzo | G06F 16/958 |
| | | | 705/1.1 |

\* cited by examiner

AGNOSTIC IMAGE DIGITIZER TO AUTOMATE COMPLIANCE FILINGS

FIELD OF TECHNOLOGY

Aspects of the disclosure relate to extending the usable lifetime of a database to assist in automated compliance filings. Aspects of the disclosure relate to digitizing an image to make it compatible with a database.

BACKGROUND OF THE DISCLOSURE

Organizations rely on computer programs to perform their daily operations. Many times, these systems are not able to cope with the adoption of modern technologies. Technology is constantly advancing and new ways for entities to provide input to organizations are changing. The formats of these inputs are also constantly changing over time.

Organizations invest significant resources of money, time, and training to bring on new systems for managing their daily operations. Without these systems performing as intended, organizations would find it difficult to operate, and would eventually cease to exist as a viable entity. Organizations often have systems that created ten, twenty, or even thirty years ago. While old, they still perform critical functions for the organization that allow the organization to continue to function.

Frequently, an organization is reluctant to replace an existing system that is critical to the organization's operations. Two of the primary considerations are as follows. First, the cost to replace the system may be materially greater than the cost to continue to operate it, even with various patches implemented to keep it going. Second, the requirement of concerned stakeholders such as auditors and regulators to certify that a new system operates with sufficient confidence. This duality may result in a significant investment to overhaul a legacy system only to have the new system fail to achieve the auditor's and regulator's requirements, leading to a significant loss of money and time without the necessary permission to implement the new system.

An organization, during its ordinary operation, may receive correspondences from an external party. In some instances, the organization may need to submit information pertaining to the correspondences to a regulatory authority. Extracting pertinent information from the correspondences and populating submissions to the regulatory may be burdensome for the organization.

There is a need to extend the usable lifetime of an organization's database such as a legacy database.

There is a further need to enhance an entity's user experience by making documents the entity submits usable by an organization's legacy database without requiring an altered submission by the entity.

There is an additional need to extract data in a legacy database to provide a dataset for training a statistical model.

There is a need to use a statistical model to aid an entity providing an organization with submissions.

The is a further need to facilitate continual improvement of a statistical model.

When a correspondence from an outside party prompts a need for a regulatory filing, there is a need to simplify a process of submitting a compliance document to an appropriate regulatory body.

SUMMARY OF THE DISCLOSURE

It is an object of the invention to extend the usable lifetime of an organization's database, such as a legacy database. Digitizing documents currently stored in an organization's database in a non-digital format, such as a picture, scan, or facsimile, may contribute to achieving this objective. Adding the data to a more state-of-the-art database may facilitate the organization's ability to implement tools, such as statistical models, to enhance an entity's user experience. The statistical model may be an artificial intelligence (AI) tool, such as a machine learning AI system or a deep learning AI system, which facilitates learning from a legacy database to enhance an entity's user experience.

It is a further object of the invention to enhance an entity's user experience by making documents of one format compatible with databases of other formats. In this aspect, the database may be a more current database including a state-of-the-art database. This object may allow for an entity to submit documents in a format that is not currently compatible with an organization's database. Digitizing submitted documents may facilitate adding data from submitted documents into the state-of-the-art database. Submissions may include pictures, scans, facsimile, and the like.

It is an additional objective of the invention to facilitate the extraction of data and metadata in a legacy database to provide a dataset for training a statistical model. Accessing data and metadata from a legacy database may include digitizing entries in the database, which may facilitate analysis of the data and metadata with less manual intervention.

It is an objective of the invention to use a statistical model to aid an entity in providing an organization with submissions, such as aiding in completing a document. This may include pre-populating fields in a document that the entity seeks to complete. This may include predicting a type of document sought by an entity based on preliminary information provided by the entity.

It is a further object of the invention to provide continual improvement to a statistical model. Using past and future data and metadata from documents submitted by an entity may allow an organization to develop and continually update a statistical model. This may include obtaining additional input from an entity to help improve the accuracy of the statistical model.

It is an objective of the invention to simplify a process of submitting a compliance document to an appropriate regulatory body. Such a need may arise when receiving correspondences from an outside party. This may include automating a submission. A processor may assist in converting a document into a form that is more compatible with a database. A processor running a statistical model based on the database may assist in automating the submission.

Provided are systems and methods to meet the above outlined objects of the invention. The words system and apparatus may be interchangeable herein.

A system may include a processor and a non-transitory computer-readable storage medium, the latter storing processor-executable instructions. This system, when executed by the processor, may cause the processor to perform one or more of the following methods.

Methods may include automating a submission of a compliance filing with a regulatory authority. Methods may include converting a document from a format that is poorly compatible with a database of the organization into a format that is compatible with the database. Methods may include building a statistical model based on the data in the database. Methods may include generating a compliance filing based on a submission of a document by an entity to an organization.

Methods may include using a processor to digitize a document from the first format into a digital format, where the first format may not be compatible with the database or may be poorly compatible with the database. Computer hardware processor may be another way to refer to the processor and may refer to where an organization's computer hardware runs the processor.

An entity may be an individual such as a person or a group of people. An entity may be an establishment such as a corporation. The corporation may be a for-profit corporation or a non-profit corporation. An entity may be a government organization, school, college, university, hospital, or the like.

An organization may be a corporation. The corporation may be a for-profit corporation or a non-profit corporation. The entity and the organization are distinct and separate from one another.

In one aspect, the digital format of the document is in bytes.

Methods may further include using the processor to convert the document from a digital format into a second format, where the second format of the document may be compatible with the database. Methods may include using the processor to populate the database on the computer server with data from the document in the second format. Methods may further include using the processor to update a statistical model based on data from the document.

Methods may include receiving another document populated with data by an entity. For reference, the newly received document is a second document, and the previously described document is a first document. Methods may include receiving the second document from the same entity as the first document. Methods may include receiving the second document from a source other than the entity which provides the first document.

The second document may pertain to, for example, an application for a product, an application for a service, a return of a product, a cancelation of a service, a change in information relating to the entity such as relating to an account the entity has with the organization.

Methods may include where the second document is compatible with the database.

Methods may include where the second document is incompatible with the database. After the step of receiving the second document from the entity, methods may further include the processor digitizing the second document into a digital format. Methods may further include the processor converting the second document in the digital format into a second format, wherein the second format is compatible with the database.

Methods may include using a processor to run a statistical model to determine an appropriate compliance filing for the second document. Types of compliance filings may relate to, for example, an application for a product, an application for a service, a return of a product, a cancelation of a service, a change in information relating to the entity such as relating to an arrangement the entity has with the organization. Types of arrangements relating to product and services include an account, a plan, an agreement, and a contract. Information relating to an arrangement that might change for the entity may include, for example, its name, its address, its legal status, its interest profile, its interest in products, and its interest in services.

Methods may include using a processor to run a statistical model to populate the compliance filing. The statistical model may rely on data in the database and data in the second document.

Methods may include using a processor to submit the populated compliance filing.

Methods may further include using optical character recognition (OCR) to digitize a populated document into a digital format, especially for use when the document is in a format that is not compatible with the organization's database.

Methods may include where the data from the first document in the second format includes metadata. Methods may include where the populating the database on the computer server with data from the first document in the second format includes metadata. Methods may include where the updating the statistical model based on data from the first document includes metadata. Methods may include where data and metadata populate the second document. Methods may include where the compliance filing populated with data includes metadata.

Before the step of submitting the populated compliance filing, the methods include providing the compliance filing to a party at the organization for approval. The party may be a department in the organization responsible for making compliance filings to a regulatory authority. The party may be an individual in the organization responsible for making compliance filings to a regulatory authority. The party may be a computer processor which runs a statistical model to determine if a compliance filing is correctly populated.

Methods may further include receiving approval from the party to file the compliance filing with the regulatory authority. Methods may further include the processor updating the database and the statistical model with information relating to the approval received from the party at the organization.

Methods may further include receiving a corrected version from the party of the compliance filing to file with the regulatory authority. Methods may further include the processor updating the database with data relating to the corrected version of the compliance filing. Methods may further include updating the statistical model with data relating to the corrected version of the compliance filing.

After the step of determining an appropriate compliance filing, the method further include the processor determining, using the statistical model, a regulatory authority which is appropriate to receive the compliance filing. The regulatory authority may be a government organization which oversees an area related to second document. The regulatory authority may be a self-regulatory organization (SRO) which oversees an area related to second document.

Methods may include using a machine learning artificial intelligence method as the statistical model. Methods may include using a deep learning artificial intelligence method as the statistical model. In one example, the deep learning artificial intelligence method uses neural networks.

BRIEF DESCRIPTION OF THE DRAWINGS

The objects and advantages of this disclosure will be apparent upon consideration of the following detailed description, taken in conjunction with the accompanying illustrative drawings, in which like reference characters refer to like parts throughout, and in which.

DETAILED DESCRIPTION OF THE DISCLOSURE

Figure 1:
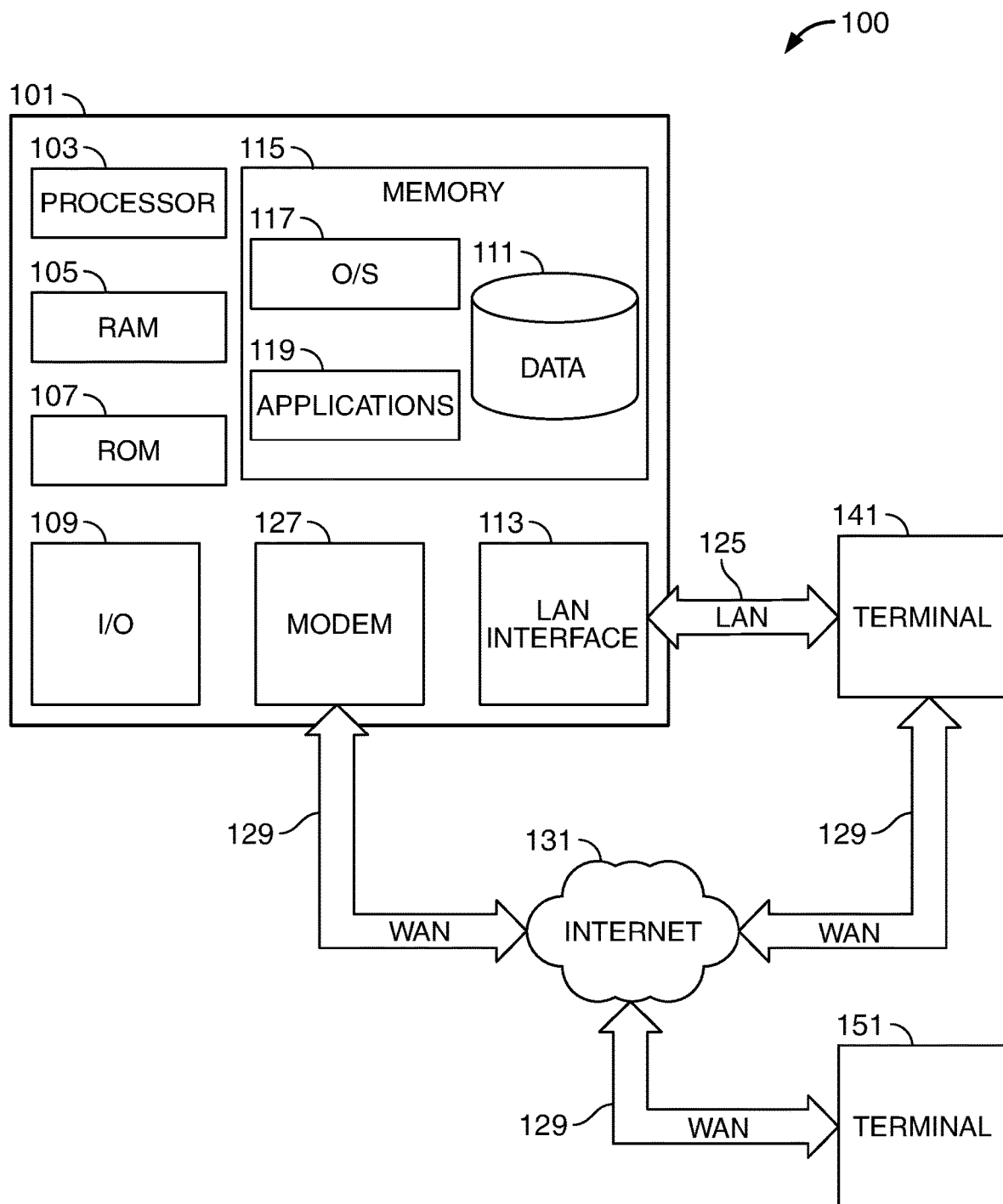
FIG. 1 is a block diagram of apparatus in accordance with principles of the disclosure.

Organizations maintain databases containing vital information to the organization's operations. Submissions from various entities may build these databases. These submissions may be in the form of documents. Documents may contain data and metadata. Entities may submit the documents to the organization by a variety of ways including ways that allow for extraction of the data and metadata from the documents to populate the databases. However, some entity submissions may not be compatible with the database.

In instances where a document submission to an organization by an entity is not compatible with the organization's database, the incompatibility may be manifest such that a processor is not able to extract data and metadata from the document or is not able to use extracted data and metadata to populate a database. The described incompatibility may be due to the format of the submitted document. For example, the document format might be that of a scanned image or a picture. The processor, for example, may need for the data to be in a textual form for data and metadata to be extractable for updating the database.

In one aspect of the current disclosure, described are systems and methods for digitizing a first format, such as a scan or a picture, into a digital format. A processor may further convert the document into another format thereby facilitating extractions of the document's data and metadata.

Another aspect of the current disclosure may include, for example, a collection of documents submitted to an organization over time. The organization may have a current system that accumulates submitted documents and archives them without extracting data and metadata. The organization may desire to implement a more advanced system where a processor extracts data and metadata from the documents and uses the data and metadata to populate a database. The submitted documents may be in a format that the processor does not recognize or cannot extra data and metadata to populate the database. In such instances, the current disclosure describes systems and methods for digitizing a first format, such as a scan or a picture, into a digital format. The processor may extract data and metadata from the digital format of the document or from a further reformat of the document.

A further aspect of the current disclosure includes utilizing a populated database, such as the one described herein, to train and implement a statistical model. The statistical model may, for example, utilize an artificial intelligence (AI) tool, such as a machine learning AI system or a deep learning AI system. The statistical model may be located on a computer server, for example, the computer server of an organization. The statistical model may make various predictions based on historical data and metadata, for example, from documents submitted by various entities.

For example, the processor running a statistical model may upload data and metadata from a document received from an entity. The processor running a statistical model may determine a document type. In an iterative way, classifying documents into distinct types may facilitate further training and utilizing the statistical model. For example, instead of just utilizing data from a specific entity or from every entity in developing a statistical model, classification allows the use of subsets of documents. The data and metadata from these documents may provide for an enhanced accuracy of the statistical model as the set of data used to train the model may be greater.

As another example, when receiving a request from an entity to complete a document, the processor running a statistical model may pre-populate all or portions of the fields in the requested document. The processor running a statistical model may provide a document to the requesting entity to verify pre-populated fields and to complete the fields that were not pre-populated.

The processor may ascertain the confidence level of the statistical model. For example, the processor may ascertain a pre-population confidence level. It may ascertain a post-population confidence level. A pre-population confidence level refers to a measure in the confidence of the statistical model before a field of a current document is pre-populated by using the statistical model. The processor may ascertain a pre-population confidence level, for example, by testing statistical model predictions against existing documents stored on a computer server used to generate the model. Achieving the pre-population confidence level may occur when predictions by the statistical model match documents stored on the computer. Such an assessment may lead to utilizing the statistical model to pre-populate a document when an entity makes a request for the document from the organization. Failing the pre-population confidence level may occur when predictions by the statistical model do not match documents stored on the computer. For example, a document submission by an entity may be subsequently received and used to update the database and statistical model. The additional data and metadata from the document may facilitate further training the model to bring it into compliance with a confidence level requirement. In another aspect, adjusting the statistical model may improve it and thereby achieve the pre-population confidence level.

A post-population confidence level refers to a measure in the confidence of the statistical model after the processor utilizing the statistical model pre-populates a field of a current document. The processor measures the accuracy of the pre-population of a document to a document completed by an entity. A confidence level represents less differences between the pre-population and completed document by the entity. Less differences lead to a higher confidence level. In reaction to differences, the processor reaches out to the entity to confirm that the change was intentional.

When the statistical model makes the error, the processor may keep count of the unsuccessful pre-populated field entry attempts. When the count exceeds a threshold, a post-population confidence level may fall out of compliance indicating a low confidence level in the statistical model. Dealt with further in the description are instances where an entity made the error.

If the post-population confidence level falls out of compliance, the processor may implement one of the following options. For example, the processor may add data and metadata from the received completed document to further train the model. The processor may use additional completed documents to extract data and metadata for the purposes of updating the statistical model. The additional data and metadata from the document may facilitate further training the model to bring it into compliance with a confidence level requirement. In another aspect, the processor or a programmer may adjust the statistical model may improve to make it achieve the pre-population confidence level.

An additional aspect of this disclosure includes error detection for submissions from an entity. When an entity requests a document, a processor may utilize a statistical model to provide a pre-populated field in the document provided to the entity. The entity may then check for the accuracy of the pre-populated fields and may add information to any of the other fields which were not pre-populated. The processor may compare the document sent to the entity to the document received. When there is a discrepancy in the pre-populated fields, as described previously, the processor may communicate the changed field or fields to the entity to confirm that the change was intentional. This action may give the entity an extrinsic way to check its work for potential errors.

When referring to data in this description, the reference may be to data from a document. The reference may be to metadata from a document. The reference may be to data and metadata from a document.

When referring to data and metadata in this description, the reference may be to both data and metadata from a document. The reference may be to either metadata or data from a document.

A further aspect of this disclosure includes using a statistical model to assist an organization in automating a compliance filing. For example, when an organization receives a submission of a document from an entity and the document is not compatible with the organization's database, the incompatibility may be manifest such that a processor is not able to extract data and metadata from the document or is not able to use extracted data and metadata to populate a database. The processor may digitize the document into a digital format. The processor may add data and metadata from the digitized document to a database on a computer server. In another aspect, the processor may convert the document from a digital format to another format, and then add the data and metadata to the database on the computer server.

Another aspect of this disclosure includes using a processor to build a statistical model from documents stored at a computer server. The statistical model references data, metadata, or data and metadata extracted from the documents and stored on a database at the computer server. In one aspect, the format of the documents is not compatible with the format of the database. The processor may digitize the document into a digital format. The processor may add data and metadata from the digitized document to a database on a computer server. In another aspect, the processor may convert the document from a digital format to another format, and then add the data and metadata to the database on the computer server.

By referencing the populated database, when an entity submits a document, a statistical model on a computer server may compare the submitted document with similar prior submissions. The processor may build the statistical model utilizing the data and metadata in a database found on a computer server. The processor may identify specific entity identifier information that facilitates locations of relevant data and metadata of potential relevance to the entity. The processor may use the entity identifier information to use a statistical model to determine expected inputs by the entity in the submitted document. When there is a difference between data and metadata in the submitted document from an entity and what the statistical model predicted the entity would enter, the processor may submit the document for further analysis. For example, the processor implements human review of the document. Furthermore, the processor may enter the results of the human review or the specialized algorithm review into the database as data to assist in training and updating the statistical model to manage future document submissions by this entity and other entities.

A further aspect of the disclosure includes automating a process for submitting compliance forms to a regulatory body. There may be instances where the organization needs to submit a received document in whole or in part to a regulatory body. When documents are not compatible or are poorly compatible with a computer server, obtaining data and metadata from the document for use in the submission of compliance forms may be difficult. In one aspect, the disclosure may include a processor for digitizing the document into a digital format. In a further aspect, the processor may extract data and metadata from the digital format for populating a compliance form. In a further aspect, the processor may use the digital format to populate a database. The processor may use the database as a source of information for populating a compliance form. In a further aspect, the processor may convert the document from a digital format into another format. The processor may then populate the database with data and metadata from this document format. The processor may utilize the updated database as a source of information for populating a compliance form.

The processor may utilize a statistical model on a computer server to assist in populating and submitting a compliance form. The processor may identify specific entity identifier information that facilitates locations of relevant data and metadata of potential relevance to the entity. The processor may use the entity identifier information to use a statistical model to determine expected inputs by the entity in the submitted document. When there is a difference between data and metadata in the submitted document from an entity and what the statistical model predicted the entity would enter, the processor may submit the document back to the entity for confirmation of the entity's submission. Once clarified, the processor may prepare a compliance form for submission to a regulatory body.

An entity may be an individual such as a person or a group of people. An entity may be an establishment such as a corporation. The corporation may be a for-profit corporation or a non-profit corporation. An entity may be a government organization, school, college, university, hospital, or the like.

An organization may be a corporation. The corporation may be a for-profit corporation or a non-profit corporation. The entity and the organization are distinct and separate from one another.

The processor may use the statistical model to determine an appropriate compliance form based on the data and metadata found in a submitted document from an entity. The statistical model based on data and metadata found in a database on a computer server may auto-populate some or all the fields on a compliance form based on submitted documents.

The statistical model on computer servers described in this specification may operate as a form of artificial intelligence (AI). One type of AI is a machine learning AI system. Another type of AI is a deep learning AI system.

One may program a machine learning AI system to identify patterns in data sets and make decisions based on the patterns. One typically uses machine learning algorithms to predict future behavior based on historical patterns. By providing new and updated data, machine learning AI systems may improve their predictions. However, even though machine learning AI systems may improve their predictions, such systems only detect patterns based on how they are pre-programmed to review provided data. Machine learning systems do not adapt on their own to look at data in unusual ways or flag patterns in the data they were not pre-programmed to search for.

On the other hand, deep learning AI systems adapt when exposed to different patterns of data. Deep learning AI systems may uncover features or patterns in data beyond their specific programming. Deep learning AI systems are typically based on neural networks. A neural network takes an input and passes the input through a network of neurons—called layers—and provides an output. The more layers of neurons which are part of the network, the "deeper" the network. A neural network learns from outputs flagged as erroneous and "adapts" its neuron connections such that the next time it receives a particular input it generates a relevant output.

Neural networks must undergo training by analyzing data sets. Neural networks learn from the training data sets provided to them and rearrange interconnections between the neurons in response to training data. The strength or weight of connections between the neurons or layers can vary. A connection between two or more layers can be strong, weak, or anywhere in between. When a neural network self-adapts it adjusts the strength of the connections among its neurons to generate more accurate outputs.

To get a neural network to provide accurate outputs, a programmer or processor adjusts the neuron connections by repeatedly training the network by exposing it to training data sets. There can be thousands and millions of neurons or layers in a network and adjusting their connections between the layers is a compute-intensive matrix-based mathematical procedure.

Typically, a programmer or processor trains a deep learning AI system using Graphics Processing Unit ("GPU") clusters of servers. A GPU is hardware capable of performing math computations over a huge amount of data at the same time. GPU's do not operate as fast as central processing units ("CPUs"). However, GPUs are capable of processing larger quantities of data per unit of time. Thus, even though each individual GPU operation may execute more slowly, applying computational operations to more data in parallel exceeds CPU performance, GPU operation may train AI system more quickly.

The training phase may go on for multiple iterations until the outputs of the AI system are satisfactory and accurate. Once that happens, less powerful hardware takes over the training of the neural network. A programmer or processor may feed data processed after the AI system is in production back into the neural network to correct it or enhance output according to the latest trends detected in newly acquired data sets. Therefore, the process of training and retraining a neural network can occur iteratively over time. Retraining a neural network is important for maintaining its accuracy with respect to new data sets.

In one aspect, a processor may implement a statistical model in various systems and methods throughout this specification, and that statistical model may be a machine learning AI system.

In another aspect, a processor may implement a statistical model in various systems and methods throughout this specification, and that statistical model may be a deep learning AI system. In one aspect, the deep learning AI system may be a neural network. In a further aspect, the neural network may be a deep neural network.

In further aspect, the processor may implement more than one statistical model in various systems and methods taught throughout this specification, and the more than one statistical model may be machine learning AI systems. In another aspect, the more than one statistical model may be deep learning AI systems. These deep learning AI systems may be neural networks. In another aspect, the more than one statistical model may be a combination of machine learning AI systems and deep learning AI systems.

Provided are systems and methods to meet the above outlined objects of the invention.

Systems may automate a submission of a compliance filing with a regulatory authority. Systems may convert a document from a format that is poorly compatible with a database of the organization into a format that compatible with the database. Systems may build a statistical model based on the data in the database. Systems may generate a compliance filing based on a submission of a document by an entity to an organization.

Systems may include the processor and the non-transitory computer-readable storage medium storing processor-executable instructions that, when executed by the processor, may cause the processor to perform the following steps.

Systems may use a processor to digitize a document from the first format into a digital format, where the first format may not be compatible with the database or may be poorly compatible with the database. A computer hardware processor may be another way to refer to the processor and may refer to where an organization's computer hardware runs the processor.

An entity may be an individual such as a person or a group of people. An entity may be an establishment such as a corporation. The corporation may be a for-profit corporation or a non-profit corporation. An entity may be a government organization, school, college, university, hospital, or the like.

An organization may be a corporation. The corporation may be a for-profit corporation or a non-profit corporation. The entity and the organization are distinct and separate from one another.

In one aspect, the digital format of the document is in bytes.

Systems may use the processor to convert the document from a digital format into a second format, where the second format of the document may be compatible with the database. Systems may use the processor to populate the database on the computer server with data from the document in the second format. Systems may use the processor to update a statistical model based on data from the document.

Systems may receive another document populated with data by an entity. For reference, the newly received document is a second document, and the previously described document is a first document. System may receive the second document from the same entity as the first document. Methods may receive the second document from a source other than the entity which provides the first document.

The second document may pertain to, for example, an application for a product, an application for a service, a return of a product, a cancelation of a service, a change in information relating to the entity such as relating to an account the entity has with the organization.

Systems may include where the second document is compatible with the database.

Systems may include where the second document is incompatible with the database. After the step of receiving the second document from the entity, systems may further include the processor digitizing the second document into a digital format. Systems may use the processor to convert the second document in the digital format into a second format, wherein the second format is compatible with the database.

Systems may use a processor to run a statistical model to determine an appropriate compliance filing for the second document. Types of compliance filings may relate to, for example, an application for a product, an application for a service, a return of a product, a cancelation of a service, a change in information relating to the entity such as relating to an arrangement the entity has with the organization. Types of arrangements relating to product and services include an account, a plan, an agreement, and a contract. Information relating to an arrangement that might change for the entity may include, for example, its name, its address, its legal status, its interest profile, its interest in products, and its interest in services.

Systems may use a processor to run a statistical model to populate the compliance filing. The statistical model may rely on data in the database and data in the second document.

Systems may use a processor to submit the populated compliance filing.

Systems may use optical character recognition (OCR) to digitize a populated document into a digital format, especially for use when the document is in a format that is not compatible with the organization's database.

Systems may include where the data from the first document in the second format includes metadata. Systems may include where the populating the database on the computer server with data from the first document in the second format includes metadata. Systems may include where the updating the statistical model based on data from the first document includes metadata. Systems may include where an entity populates a second document with data includes metadata. Systems may include where the compliance filing populated with data includes metadata.

Before the step of submitting the populated compliance filing, systems may include providing the compliance filing to a party at the organization for approval. The party may be a department in the organization responsible for making compliance filings to a regulatory authority. The party may be an individual in the organization responsible for making compliance filings to a regulatory authority. The party may be a computer processor which runs a statistical model to determine if a compliance filing is correctly populated.

Systems may receive approval from the party to file the compliance filing with the regulatory authority. Systems may use the processor to update the database and the statistical model with information relating to the approval received from the party at the organization.

Systems may receive a corrected version from the party of the compliance filing to file with the regulatory authority. Systems may use the processor to update the database with data relating to the corrected version of the compliance filing. Systems may update the statistical model with data relating to the corrected version of the compliance filing.

After the step of determining an appropriate compliance filing, systems may use the processor to determine, using the statistical model, a regulatory authority which is appropriate to receive the compliance filing. The regulatory authority may be a government organization which oversees an area related to second document. The regulatory authority may be a self-regulatory organization (SRO) which oversees an area related to second document.

Systems may use a machine learning artificial intelligence method as the statistical model. Systems may use a deep learning artificial intelligence method as the statistical model. In one example, the deep learning artificial intelligence method uses neural networks.

In a different aspect of the disclosure, methods may include automating a submission of a compliance filing with a regulatory authority. Methods may include converting a document from a format that is poorly compatible with a database of the organization into a format that compatible with the database. Methods may include building a statistical model based on the data in the database. Methods may include generating a compliance filing based on a submission of a document by an entity to an organization.

Methods may include receiving a document from the entity in a first format. The first format may not be compatible with the database or may be poorly compatible with the database.

Methods may include using a processor to digitize a document from the first format into a digital format, where the first format may not be compatible with the database or may be poorly compatible with the database. In one aspect, the digital format of the document is in bytes.

Methods may further include using the processor to convert the document from a digital format into a second format, where the second format of the document may be compatible with the database. Methods may include using the processor to populate the database on the computer server with data from the document in the second format. Methods may further include using the processor to update a statistical model based on data from the document.

Methods may include using a processor to run a statistical model to determine an appropriate compliance filing related to the document. Types of compliance filings may relate to, for example, an application for a product, an application for service, a return of a product, a cancelation of a service, a change in information relating to the entity such as relating to an arrangement the entity has with the organization. Types of arrangements relating to product and services include an account, a plan, an agreement, and a contract. Information relating to an arrangement that might change for the entity may include, for example, its name, its address, its legal status, its interest profile, its interest in products, and its interest in services.

Methods may include using a processor to run a statistical model to populate the compliance filing. The statistical model may rely on data in the database and document.

Methods may include using a processor to submit the populated compliance filing.

Described are illustrative embodiments of apparatus and methods in accordance with the principles of the invention with reference to the accompanying illustrative drawings, which form a part hereof. Utilizing other embodiments, and structural, functional, and procedural modifications may stay within the scope and spirit of the present invention.

The drawings show illustrative features of apparatus and methods in accordance with the principles of the invention. The drawings show illustrative features in the context of selected embodiments. One may practice, in accordance with the principles of the invention, one of the embodiments along with features shown in connection with another of the embodiments.

Apparatus and methods described herein are illustrative. Apparatus and methods of the invention may involve some or all the features of the illustrative apparatus and/or some or all the steps of the illustrative methods. One may perform the steps of the methods in an order other than the order shown or described herein. Some embodiments may omit steps shown or described in connection with the illustrative methods. Some embodiments may include steps not shown or described in connection with the illustrative methods but shown or described in a different portion of the specification.

One of ordinary skill in the art will appreciate that one may perform the steps shown and described herein in other than the recited order and that one or more steps illustrated may be optional. The methods of the above-referenced embodiments may involve the use of any suitable elements, steps, computer-executable instructions, or computer-readable data structures. In this regard, disclosed are other embodiments as well that can be partially or wholly implemented on a computer-readable medium, for example, by storing computer-executable instructions or modules or by utilizing computer-readable data structures.

FIG. 1 shows an illustrative block diagram of system 100 that includes computer 101. One may refer to Computer 101 as an "engine," "server" or "computing device." Computer 101 may be a workstation, desktop, laptop, tablet, smart phone, or any other suitable computing device. One may use elements of system 100, including computer 101, to implement various aspects of the systems and methods disclosed herein. (Each of the apparatus illustrated in FIGS. 3-5 and 9-11 and/or described herewith, including Hash Table 302, Edge Computing Device 304, hashing algorithm processor 404 and centralized data repository 930, may include some or all the elements and apparatus of system 100.)

Computer 101 may have processor 103 for controlling operation of the device and its associated components, and may include RAM 105, ROM 107, input/output module 109, and non-transitory/non-volatile machine-readable/writeable memory 115. One may configure machine-readable/writeable memory to store information in machine-readable/writeable data structures. Processor 103 may also execute all software running on the computer—e.g., an operating system and/or voice recognition software. Other components commonly used for computers, such as EEPROM or Flash memory or any other suitable components, may also be part of computer 101.

Memory 115 may contain any suitable permanent storage technology—e.g., a hard drive. Memory 115 may store software including operating system 117 and application program(s) 119 along with any data 111 needed for operation of system 100. Memory 115 may also store videos, text, and/or audio assistance files. One may store data in memory 115, in cache memory, or in any other suitable memory.

Input/output ("I/O") module 109 may include connectivity to a microphone, keyboard, touch screen, mouse, and/or stylus. One may provide input into computer 101 through these I/O modules. The input may include input relating to cursor movement. I/O 109 may also include one or more speakers for providing audio output and a video display device for providing textual, audio, audiovisual, and/or graphical output. The input and/or output may be related to computer application functionality.

One may connect System 100 to other systems via local area network (LAN) interface (or adapter) 113. System 100 may operate in a networked environment supporting connections to one or more remote computers, such as terminals 141 and 151. Terminals 141 and 151 may be personal computers or servers that include many or all the elements described above relative to system 100. Network connections depicted in FIG. 1 include a local area network (LAN) 125 and a wide area network (WAN) 129 but may also include other networks. One may connect computer 101 to LAN 125 through LAN interface (or adapter) 113 when using a LAN networking environment. When used in a WAN networking environment, computer 101 may include modem 127 or other means for establishing communications over WAN 129, such as Internet 131.

One appreciates that the network connections shown are illustrative. One may use other means of establishing a communications link between computers. One may presume the existence of various well-known protocols such as TCP/IP, Ethernet, FTP, HTTP, and the like. One may operate the system in a client-server configuration to permit retrieval of data from a web-based server or API. One may understand that web-based, for the purposes of this application, includes a cloud-based system. The web-based server may transmit data to any other suitable computer system. The web-based server may also send computer-readable instructions, together with data, to any suitable computer system. The computer-readable instructions may be to store data in cache memory, the hard drive, secondary memory, or any other suitable memory.

Additionally, one may use application program(s) 119 on computer 101. These programs may include computer executable instructions for invoking functionality related to communication, such as e-mail, Short Message Service (SMS), and voice input and speech recognition applications. One may refer to application program(s) 119 (alternatively, "plugins," "applications," or "apps") to include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of calls received from calling sources as detailed herein.

Application program(s) 119 may include computer executable instructions (alternatively referred to as "programs"). Embodied in hardware or firmware (not shown) may be the computer executable instructions. Computer 101 may execute the instructions embodied by the application program(s) 119 to perform various functions.

Application program(s) 119 may utilize the computer-executable instructions executed by a processor. Programs include routines, programs, objects, components, data structures, etc. that perform tasks or implement abstract data types. A computing system may be operational with distributed computing environments. Remote processing may perform tasks on devices linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Stored in memory 115 is any information described above in connection with database 111, and any other suitable information. One or more of application program(s) 119 may include one or more algorithms used to add data and metadata to a database, identify a type of form being used, predict fields in a document, identify changes between documents, provide changes to an entity to ascertain if an error is present, identify fraud concerns, communicate fraud concerns to interested parties within an organization, and provide documents for providing to a regulatory authority.

One may describe the invention in the context of computer-executable instructions, such as application program(s) 119, for execution by a computer. Programs may include routines, programs, objects, components, and data structures, which perform tasks or implement data types. One may practice the invention in distributed computing environments. One may perform tasks by remote processing devices, linked through a communications network. In a distributed computing environment, programs may be in both local and remote computer storage media including memory storage devices. One may consider such programs, for the purposes of this application, as engines with respect to the performance of the program-assigned tasks.

Computer 101 and/or terminals 141 and 151 may also include various other components, such as a battery, speaker, and/or antennas (not shown). One may link components of computer system 101 by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting and/or displaying relevant information. Terminal 151 and/or terminal 141 may be one or more user devices. Terminals 151 and 141 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
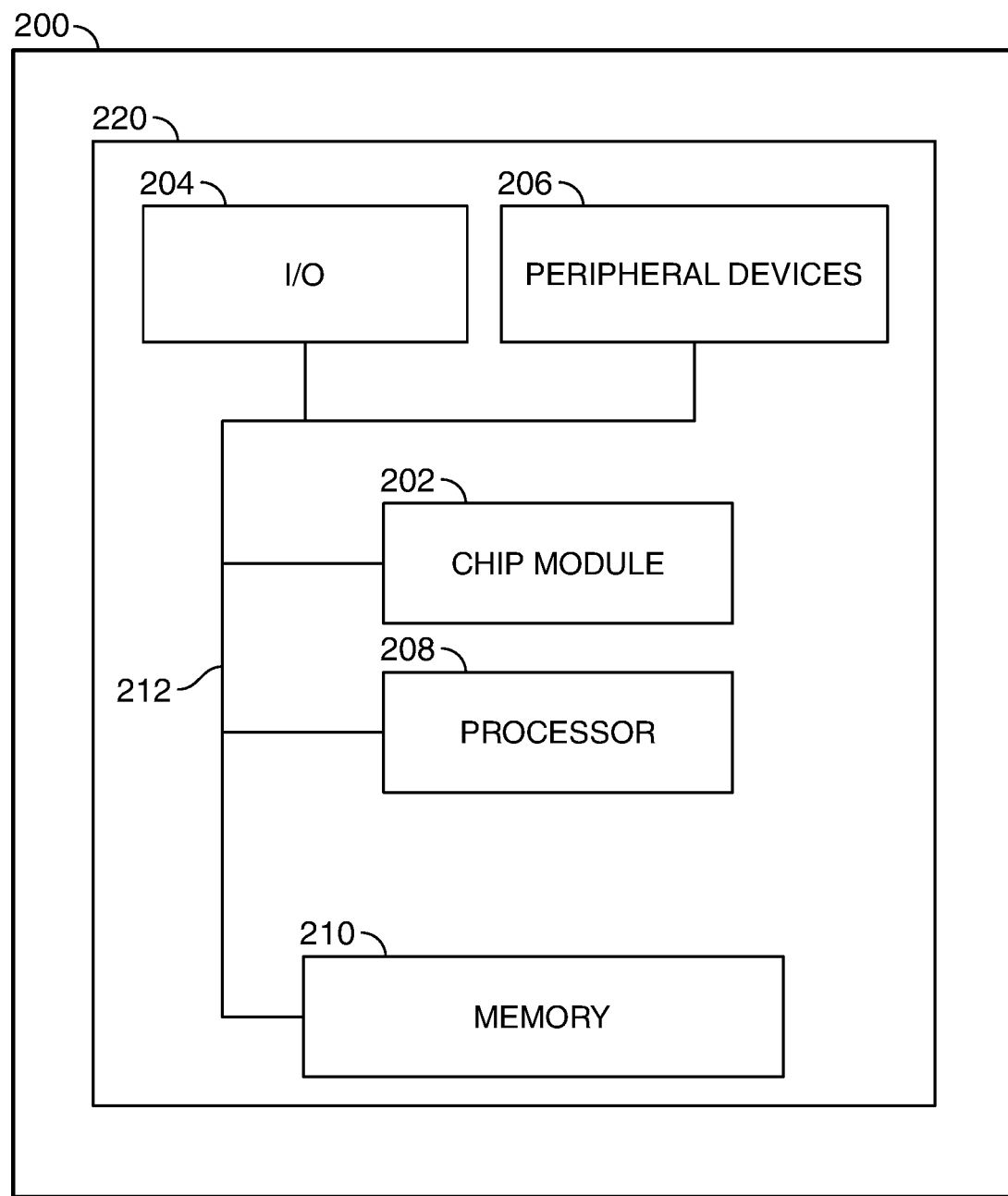
FIG. 2 is another block diagram of apparatus in accordance with principles of the disclosure.

FIG. 2 shows an illustrative block diagram of apparatus 200. One may configure apparatus 200 in accordance with the principles of the disclosure. Apparatus 200 may be a computing device. (Apparatus 200 may include one or more features of the apparatus shown in FIGS. 3-5 and 9-11 and/or described herewith, including Hash Table 302, Edge Computing Device 304, hashing algorithm processor 404 and centralized data repository 930, and may include some or all the elements and apparatus of system 100 shown in FIG. 1.) Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of data; and machine-readable/writeable memory 210.

One may configure machine-readable/writeable memory 210 to store information in machine-readable/writeable data structures, such as: machine executable instructions (for example, "computer instructions" or "computer code"); applications, signals; and/or any other suitable information or data structures.

One may couple together components 202, 204, 206, 208 and 210 by system bus (or other interconnections) 212 and may be present on one or more than one circuit board 220. In some embodiments, the components may be integrated into a single chip. The chip may be silicon-based.

Figure 3:
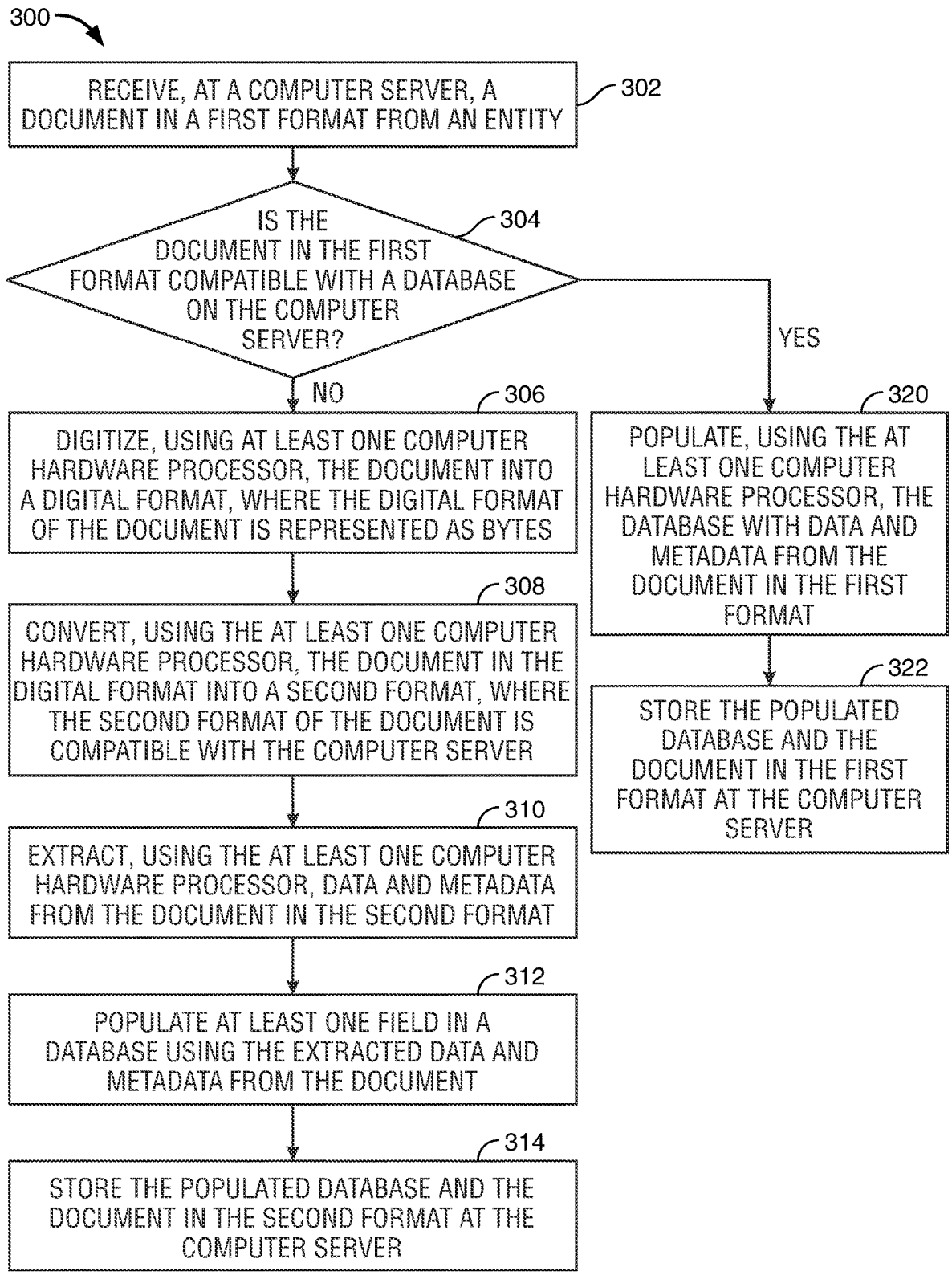
FIG. 3 is a flowchart of a process in accordance with principles of the disclosure.

FIG. 3 shows illustrative flowchart 300 of method steps for enhancing compatibility of a document of an entity with a database of an organization on a computer server.

Depicted is flowchart 300 as starting at step 302. Received at step 302 is a document in a first format from the entity, at the computer server. At step 304, it may be determined if the document in the first format is compatible with the database on the computer server.

If the document in the first format is compatible with the database, then at step 320, at least one computer hardware processor populates the database with data from the document in the first format. The at least one computer hardware processor may populate the database with metadata from the document in the first format. The at least one computer hardware processor may populate the database with data and metadata from the document in the first format. At step 322, the at least one computer hardware processor stores the populated database, and the document in the first format at the computer server.

If the document in the first format is not compatible with the database, then at step 306, at least one computer hardware processor digitizes the document into a digital format such as bytes.

At step 308, at least one computer hardware processor converts the document from the digital format into a second format, where the second format of the document may be compatible with the computer server.

At step 310, at least one computer hardware processor may extract data, metadata, or both data and metadata from the document in the second format.

At step 312, at least one computer hardware processor may populate at least one field in a database using the extracted data, metadata, or data and metadata from the document.

At step 314, the computer servers store the populated database and the document in the second format.

Figure 4:
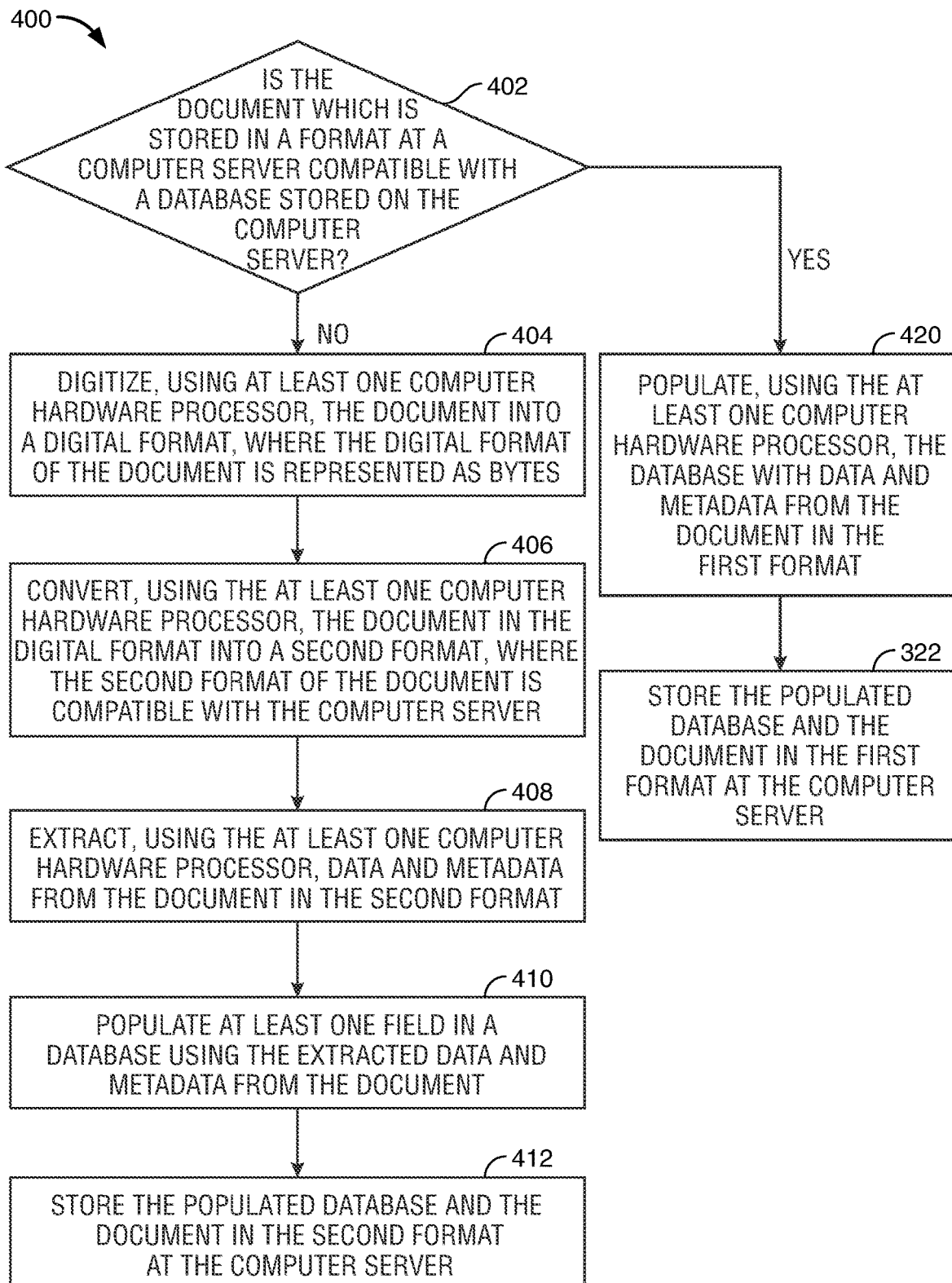
FIG. 4 is another flowchart of a process in accordance with principles of the disclosure.

FIG. 4 shows illustrative flowchart 400 of method steps for harvesting data from one or more documents stored on a computer server for populating a database of an organization. The computer servers may store the database. The one or more documents may be a legacy system. The one or more documents may not be compatible with the database. The method may enhance the compatibility of one or more documents.

Depicted is flowchart 400, starting at step 402. At step 402, at least one computer hardware processor determines the compatibility of a document stored in a first format with a database stored on a computer server.

If the document in the first format is compatible with the database, then at step 420, at least one computer hardware processor populates the database with data, metadata, or both data and metadata from the document in the first format. At step 422, the computer servers store the populated database, and the document in the first format.

If the document in the first format is not compatible with the database, then at step 404, at least one computer hardware processor digitizes the document into a digital format, such as bytes.

At step 406, at least one computer hardware processor may convert the document from the digital format into a second format, where the second format of the document may be compatible with the computer server.

At step 408, at least one computer hardware processor extracts data, metadata, or data and metadata from the document in the second format.

At step 410, at least one computer hardware processor may extract data, metadata, or data and metadata from the document and populate at least one field in a database.

At step 412, at least one computer hardware processor may populate the database and the document in the second format at the computer server.

Figure 5A:
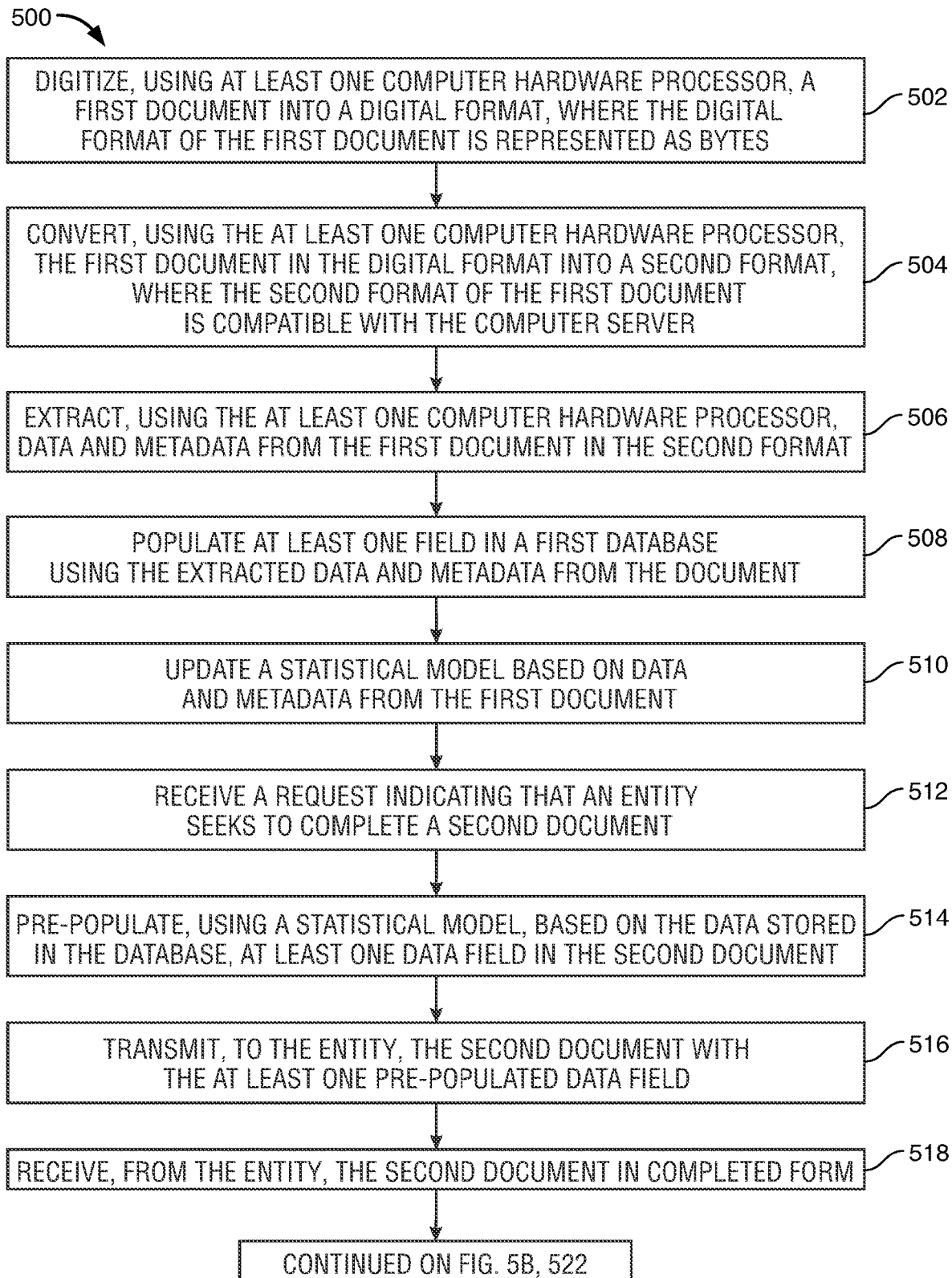
FIG. 5A is a flowchart of a process in accordance with principles of the disclosure.

FIG. 5A shows illustrative flowchart 500 of method steps for harvesting data and metadata from one or more documents stored on a computer server for populating a database of an organization. At least one computer hardware processor may update a statistical model with data, metadata, or data and metadata from the populated database. The method may include pre-populating a document requested by using the statistic model. The method may include verifying with an entity if a change is correct between the pre-populated document and a completed document received back from the entity.

Depicted is a flowchart 500, starting at step 502. At step 502, at least one computer hardware processor may digitize a document into a digital format, such as bytes.

At step 504, the at least one computer hardware processor may convert the document from the digital format into a second format, using the at least one computer hardware processor, where the second format of the document may be compatible with the computer server.

At step 506, at least one computer hardware processor may extract data, metadata, or data and metadata from the document in the second format.

At step 508, the at least one computer hardware processor may populate at least one field in a database with data, metadata, or data and metadata extracted from the document.

At step 510, at least one computer hardware processor may update a statistical model based on data, metadata, or data and metadata from the first document.

Received at step 512 is a request from an entity to complete a second document.

At step 514, the at least one computer hardware processor, using the statistical model based on the data, metadata, or data and metadata stored in the database, pre-populates at least one data field in the second document.

Transmitted, at step 516, is the second document, with at least one pre-populated data field, to the entity.

Received, at step 518, is the second document from the entity in completed form. The method continues in FIG. 5B with step 522.

Figure 5B:
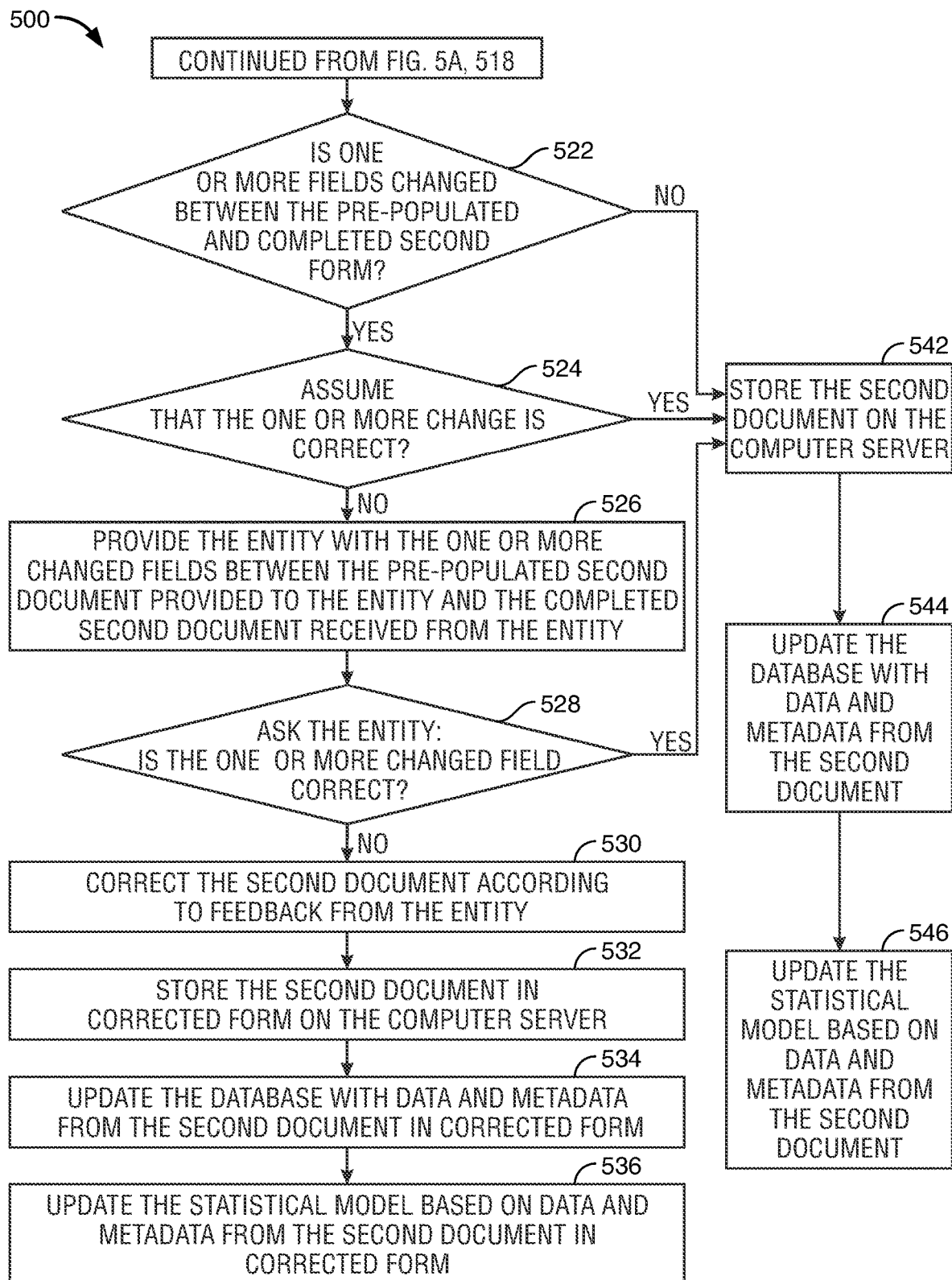
FIG. 5B is a flowchart of a process in accordance with principles of the disclosure and is a continuation of the flowchart of FIG. 5A.

FIG. 5B is a continuation of the flowchart begun in FIG. 5A. FIG. 5B shows illustrative flowchart 500 of method steps.

At step 522, it may be determined if one or more fields changed between the pre-populated and completed second form.

At step 542, with no field changed between the pre-populated and completed second form, the computer servers may: store the second document; update the database, at step 544, with data, metadata, or data and metadate from the second document; update the statistical model, at step 546, based on data, metadata, or data and metadata from the second document; and/or determine the correctness of at least one field change between the pre-populated and completed second form at step 524.

When assuming that one or more changes are correct, the servers may implement steps 542, 544 and 546, as previously described.

When not assuming that one or more changes are correct, the servers may seek verification from the entity; provide the entity, at step 526, with the one or more changed fields identified between the pre-populated second document provided to the entity and the completed second document received from the entity; provide the entity, at step 528, with an inquiry as to whether the one or more changed fields in the completed second document is correct, or if the pre-populated field in the second document provided to the entity is correct and/or follow steps 542, 544 and 546 if the entity provides feedback that the one or more changed fields are correct.

At step 530, the servers may correct the second document in accordance with the feedback from the entity, at step 532, store the corrected form of the second document on the computer server, at step 534, update the database with data, metadata, or data and metadata from the second document in corrected form and/or, at step 536, update the statistical model based on data, metadata, or data and metadata from the second document in corrected form.

Figure 6A:
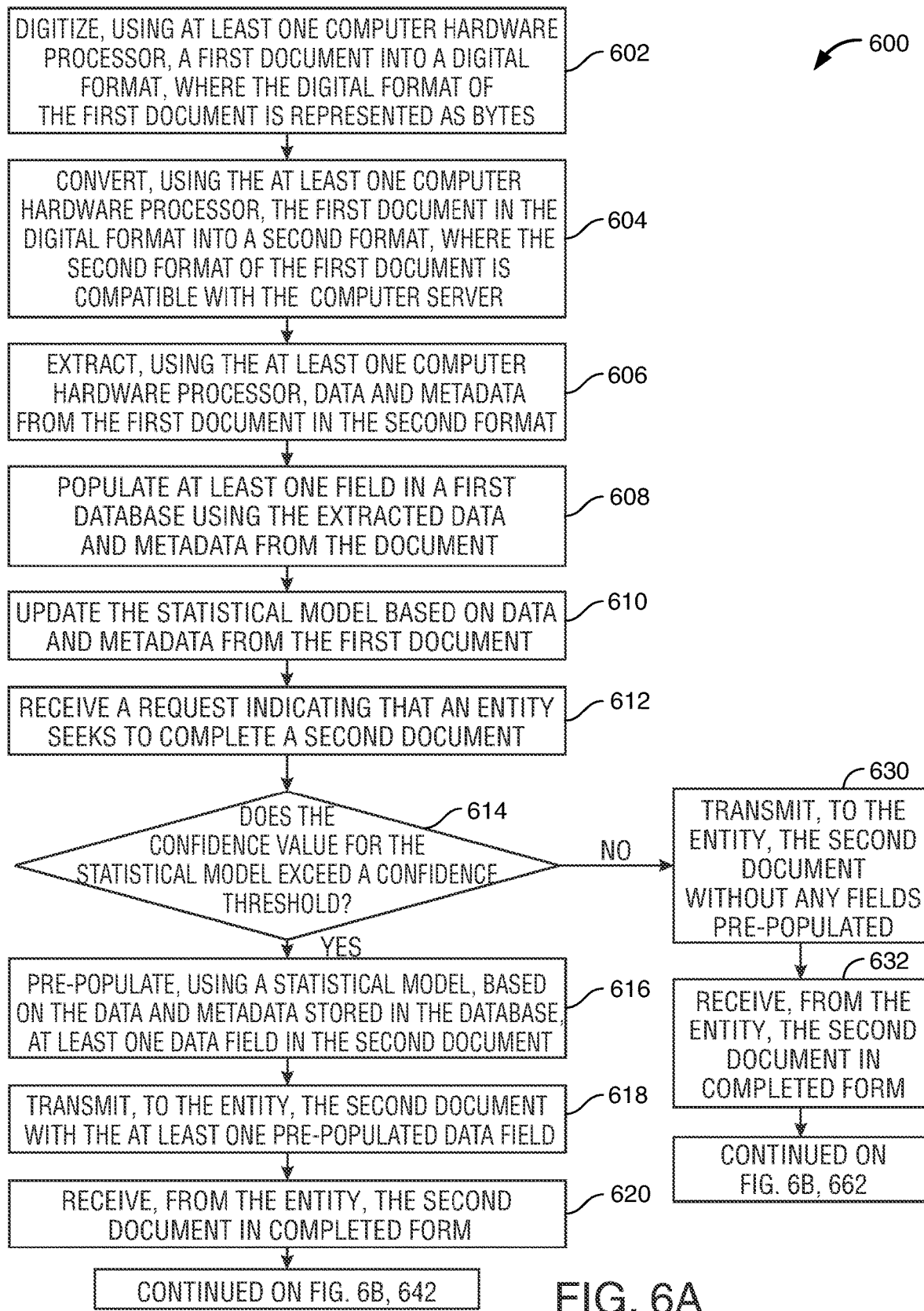
FIG. 6A is a flowchart of a process in accordance with principles of the disclosure.

FIG. 6A shows illustrative flowchart 600 for harvesting data and metadata from one or more documents stored on a computer server for populating a database of an organization. At least one computer hardware processor may update the database and a statistical model based on data and metadata from similar documents. The method may include pre-populating a document requested by using the statistic model. The method may include verifying with an entity if a change is correct between the pre-populated document and a completed document received back from the entity.

The method may further include at least one computer hardware processor to verify sufficient training of the statistic model. One may then use at least one computer hardware processor to implement the statistical model. For example, the at least one computer hardware processor may set and monitory a confidence threshold, based on a range of factors, and implement the statistic model after reaching the threshold, or may implement more training of the model before reaching the threshold.

Further, methods include at least one computer hardware processor determining a count of unsuccessful attempts to pre-populate a document. When exceeding a threshold, the method may provide for gathering more data and metadata from one or more documents completed by one or more entities. At least one computer hardware processor uses the additional data and metadata to train and update the statistical model. Once accomplishing an amount of training of the statistical model, the method may allow for utilizing the statistical method for subsequent requests to complete a document by an entity. Upon reaching a confidence threshold, such as the method described previously, or other measure of confidence, at least one computer hardware processor implements the statistical model.

Depicted is a flowchart 600, starting at step 602. At step 602, at least one computer hardware processor may digitize a document into a digital format, such as bytes.

At step 604, the at least one computer hardware processor may convert the document from the digital format into a second format, using the at least one computer hardware processor, where the second format of the document may be compatible with the computer server.

At step 606, at least one computer hardware processor may extract data, metadata, or data and metadata from the document in the second format.

At step 608, at least one computer hardware processor may populate at least one field in a database with data, metadata, or data and metadata extracted from the document.

At step 610, at least one computer hardware processor may update a statistical model based on data, metadata, or data and metadata from the first document.

Received at step 612 is a request from an entity to complete a second document.

Once accomplishing an amount of training of the statistical model, the method may allow for utilizing the statistical method for subsequent requests to complete a document by an entity.

At step 614, upon reaching a confidence threshold, such as the method described previously, or other measure of confidence, at least one computer hardware processor implements the statistical model.

At step 614, at least one computer hardware processor determines the confidence value for the statistical model. When the confidence value does not exceed a confidence threshold, then, at step 630, at least one computer hardware processor transmits the second document to the entity without any fields pre-populated.

At least one computer hardware processor receives, at step 632, the completed second document. The method continues in FIG. 6B with step 662.

When the confident value exceeds a confidence threshold, then, at step 616, the at least one computer hardware processor, using the statistical model based on the data, metadata, or data and metadata stored in the database, pre-populates at least one data field in the second document.

Transmitted, at step 618, is the second document, with at least one pre-populated data field, to the entity.

Received, at step 620, is the second document from the entity in completed form. The method continues in FIG. 6B with step 642.

Figure 6B:
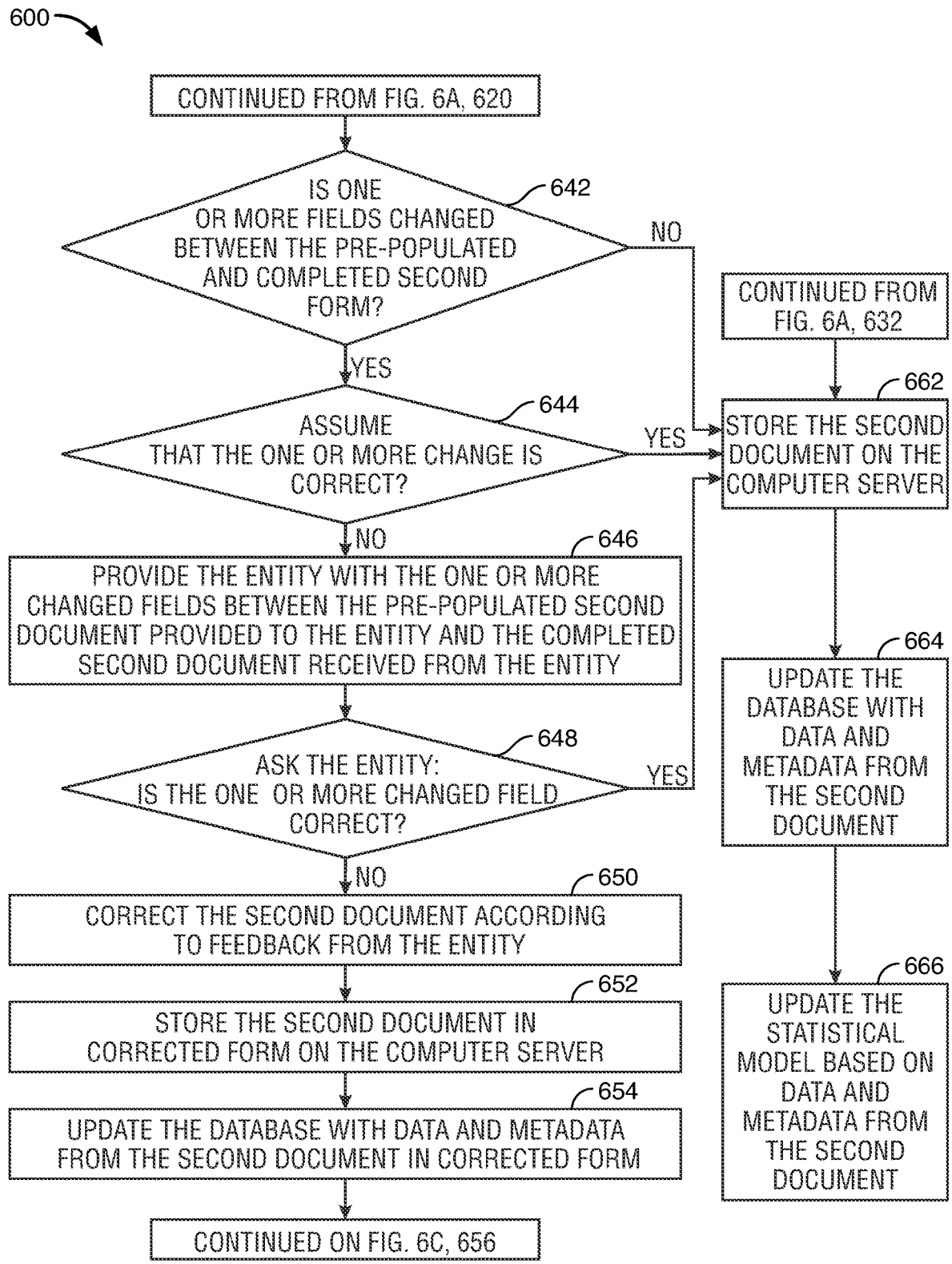
FIG. 6B is a flowchart of a process in accordance with principles of the disclosure and is a continuation of the flowchart of FIG. 6A.

FIG. 6B is a continuation of the method begun in FIG. 6A. FIG. 6B shows illustrative flowchart 600 of method steps.

Continuing from step 632 in FIG. 6A, the method continues in FIG. 6B with step 662. At step 662, at least one computer hardware processor stores the second document on the computer server.

At step 664, at least one computer hardware processor updates the database with data, metadata, or data and metadata from the second document.

At step 666, at least one computer hardware processor updates the statistical model based on data, metadata, or data and metadata from the second document.

Continuing from step 620 in FIG. 6A, the method continues in FIG. 6B with step 642. At step 642, at least one computer hardware processor determines differences in the data fields between the pre-populated and completed second document.

At step 662, at least one computer hardware processor stores the second document on the computer server when the fields are similar between the pre-populated and completed second form. At step 664, at least one computer hardware processor updates the database with data, metadata, or data and metadate from the second document. At step 666, at least one computer hardware processor updates the statistical model based on data, metadata, or data and metadate from the second document.

When there is at least one change, one may determine the correctness of at least one field changed between the pre-populated and completed second form at step 644.

When assuming that one or more changes are correct, implement steps 662, 664, and 666, as previously described.

When assuming that one or more changes are correct, seek verification from the entity. Provide the entity, at step 646, with the one or more changed fields identified between the pre-populated second document provided to the entity and the completed second document received from the entity.

Provide the entity, at step 648, with an inquiry as to whether the one or more changed fields in the completed second document is correct, or if the pre-populated field in the second document provided to the entity is correct.

Follow steps 662, 664 and 666 if the entity provides feedback that the one or more changed fields are correct.

At step 650, correct the second document in accordance with the feedback from the entity.

At step 652, store the corrected form of the second document on the computer server.

At step 654, update the database with data, metadata, or data and metadata from the second document in corrected form. The method may continue in FIG. 6C with step 656.

Figure 6C:
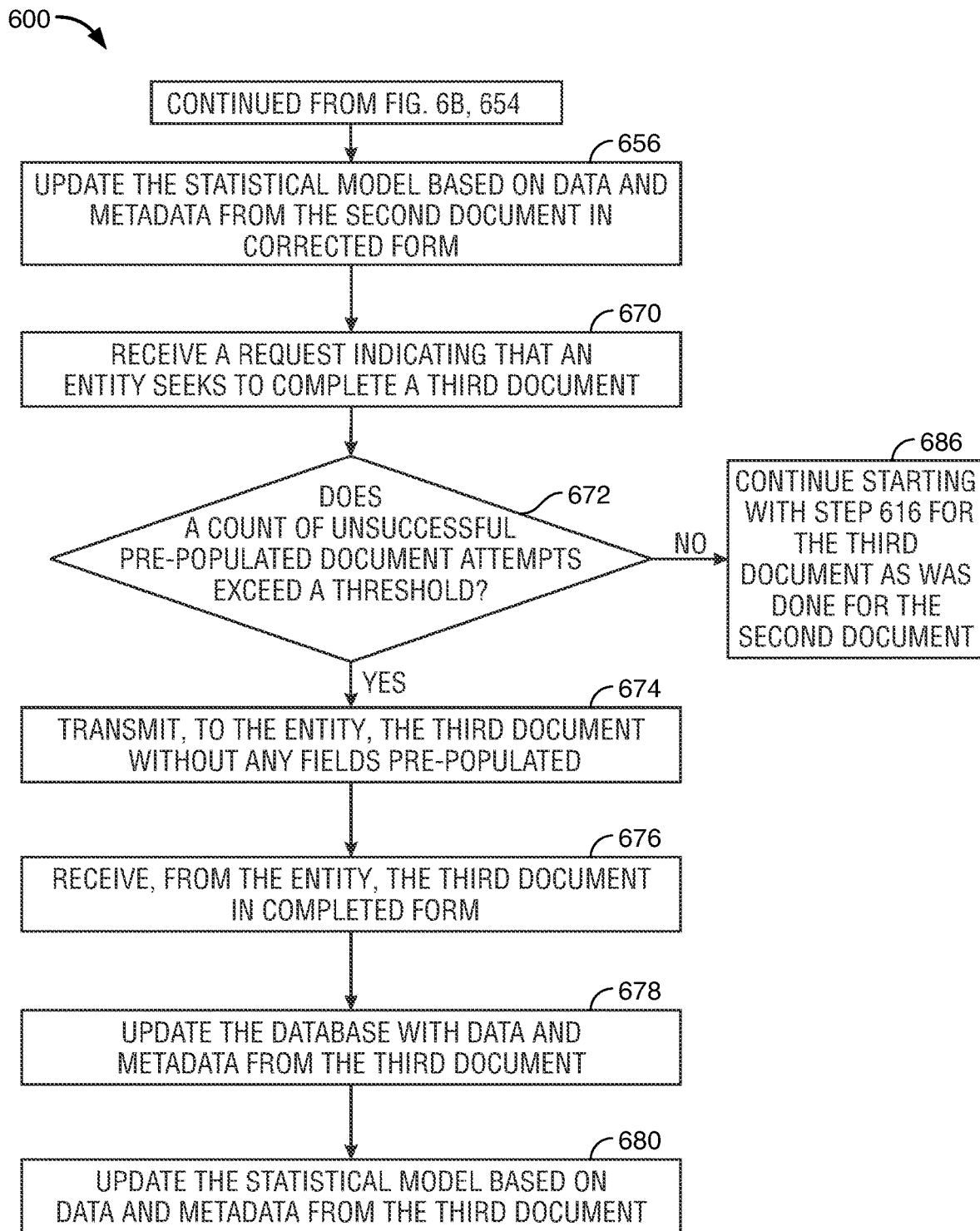
FIG. 6C is a flowchart of a process in accordance with principles of the disclosure and is a continuation of the flowchart of FIG. 6B.

FIG. 6C is a continuation of the method begun in FIG. 6B. FIG. 6C shows illustrative flowchart 600 of method steps.

At step 656, update the statistical model based on data, metadata, or data and metadata from the second document in corrected form Received, at step 670, is a request indicating that an entity seeks to complete a third document. Determined, at step 672, is a count of unsuccessful pre-populated document attempts.

If the count of unsuccessful pre-populated documents does not exceed a threshold, then, at step 686, the method may continue with step 616, except implementing the method for a third document instead of a second document.

If the count of unsuccessful pre-populated documents does exceed a threshold, then, at step 674, at least one computer hardware processor transmits the third document to the entity without any fields pre-populated.

Received from the entity, at step 676, is the third document in completed form.

At step 678, at least one computer hardware processor may update the database with data, metadata, or data and metadata from the third document.

At step 680, at least one computer hardware processor may update the statistical model based on data from the third document.

Figure 7:
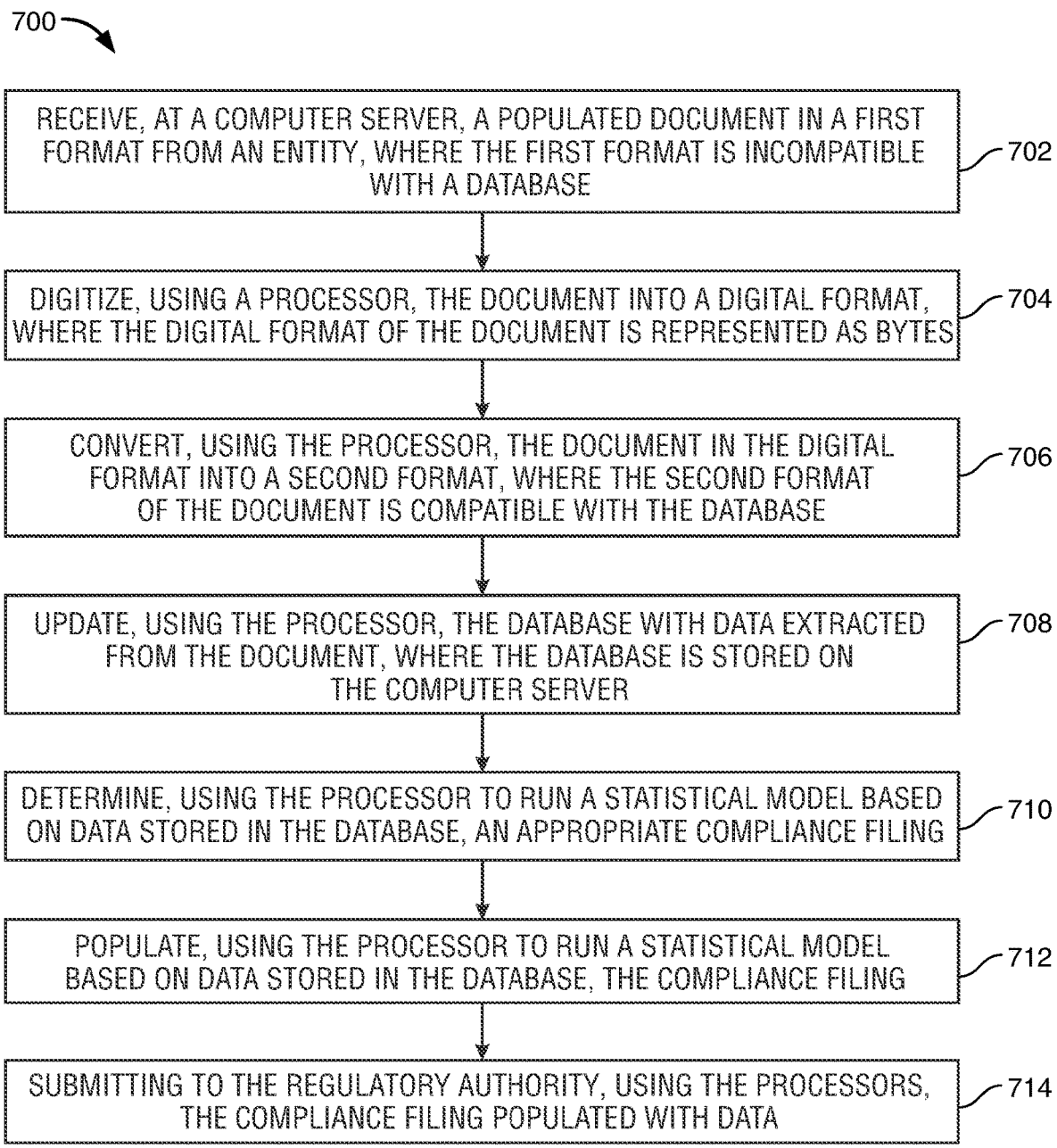
FIG. 7 is another flowchart of a process in accordance with principles of the disclosure.

FIG. 7 shows illustrative flowchart 700 of method steps for automating a submission of a compliance filing with a regulatory authority. The compliance filing can relate to a submission of a document by an entity to an organization. The document can be in a format that is poorly compatible with a database of the organization.

Depicted is flowchart 700 as starting at step 702. At step 702, a computer server can receive a document in a first format from the entity. The first format can be incompatible with the database. At step 704, a processor can digitize the document into a digital format such as bytes.

At step 706, the processor can convert the document from the digital format into a second format, where the second format of the document can be compatible with the computer server. At step 708, a processor can update the database with data extracted from the document. The computer server can store the database. At step 710, a processor can run a statistical model based on data stored in the database to determine an appropriate compliance filing.

At step 712, the processor can run a statistical model based on data stored in the database to determine an appropriate compliance filing.

At step 714, the processor can submit to the regulatory authority the compliance filing populated with data. The compliance filing can pertain to a change in information relating to an arrangement the entity has with the organization. The compliance filing can pertain to an application for a product or a service by the entity to the organization. The compliance filing can pertain to a return of a product or cancelation of a service received by the organization from the entity.

Figure 8:
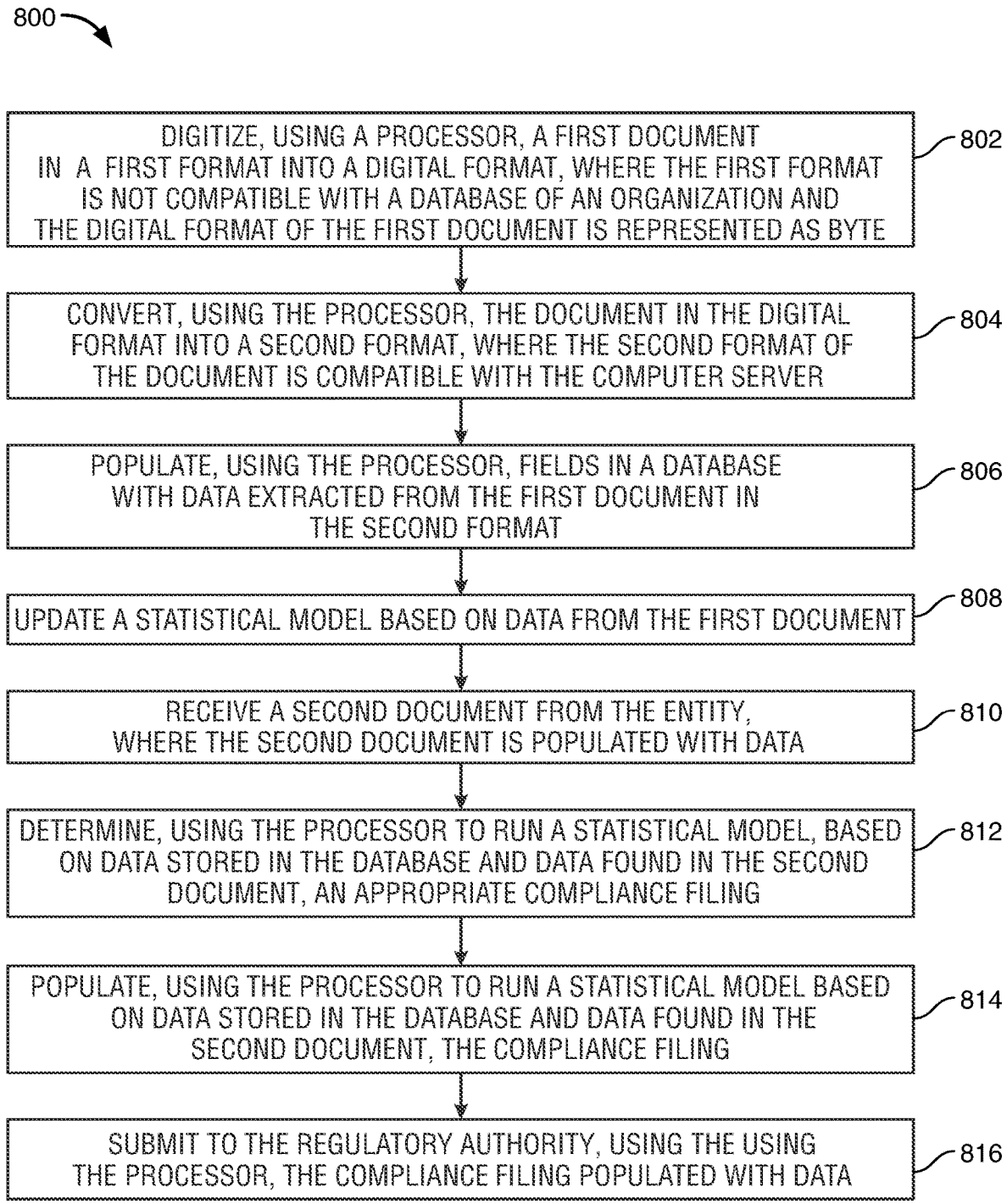
FIG. 8 is another flowchart of a process in accordance with principles of the disclosure.

FIG. 8 shows illustrative flowchart 800 of method steps for enhancing compatibility of a document with a database of an organization to facilitate use of a statistical model. A computer server can store the database. The statistical model, based on the contents of the database, can automate a submission of a compliance filing with a regulatory authority.

Depicted is flowchart 800 as starting at step 802. At step 802, a processor can digitize a first document into a digital format, such as bytes, where the first format is not compatible with the database of the organization.

At step 804, the processor can convert the first document from the digital format into a second format, where the second format of the first document can be compatible with the computer server. At step 806, a processor can populate the database with data extracted from the first document. The computer server can store the database. At step 808, a processor can update the statistical model based on data from the first document.

At step 810, a computer server can receive a populated second document from the entity. At step 812, the processor can run a statistical model, based on data stored in the database and data found in the second document, to determine an appropriate compliance filing.

At step 814, the processor can run a statistical model, based on data stored in the database and one or more entity identifiers, to populate a compliance filing. At step 816, a processor can submit to the regulatory authority the compliance filing populated with data.

Presented herein are systems and methods for enhancing compatibility of a document to facilitate addition of data from the document to a database and use of the database to power a statistical model to automate a submission of a compliance filing. Persons skilled in the art may practice the present invention in other than the described embodiments. Presented are embodiments for purposes of illustration rather than of limitation. Only the claims that follow limit the present invention.

What is claimed is:

1. A method for automating submission of compliance filings with a regulatory authority, the method comprising:
   receiving, at a computer hardware processor, a first set of documents comprising two or more documents in a first format, the first format comprising a format that the computer hardware processor cannot use to extract data, said first set of documents are stored on a computer server;
   converting, using the computer hardware processor to perform optical character recognition (OCR), the first set of documents from the first format into a second format, the second format comprising a format that the computer hardware processor can use to extract data from a document;
   accessing, using the computer hardware processor, a first set of compliance filings with a regulatory authority comprising two or more compliance filings in the second format from the computer server, wherein the first set of compliance filing relates to a submission of the first set of documents by an entity to an organization and the first set of documents is in a format that is poorly compatible with a database of the organization;
   populating, using the computer hardware processor, the database with data extracted from the first set of documents in the second format and the first set of compliance filings in the second format, where the database is stored on the computer server;
   training, using a graphics processing unit (GPU) and the database, a first statistical model, the first statistical model comprising a deep learning artificial intelligence (AI) system, to determine a type of compliance filing to file based on the first set of documents and the first set of compliance filings with a regulatory authority;
   training, using the GPU and the database, a second statistical model based on a receipt of a document, the second statistical model comprising a deep learning AI system, to, after receiving the type of compliance filing from the first statistical model, populate a compliance filing;
   receiving, at the computer hardware processor, a second document from an entity in the first format, where the second document is populated with data;
   converting, using the computer hardware processor to perform OCR, the second document into the second format;
   running, using the GPU and the second document, the first statistical model to determine the type of compliance filing to file;
   using the type of compliance filing to file as determined by the first statistical model, running, using the GPU and the second document, the second statistical model to populate a compliance filing for submission to a first regulatory authority; and
   submitting to the first regulatory authority, using the computer hardware processor, the compliance filing populated with data;
   wherein:
      the second document and the compliance filing relate to a change in information relating to an arrangement the entity has with the organization.

2. The method of claim 1, wherein:
   data used to populate the database from the first set of documents in the second format includes metadata associated with the first set of documents.

3. The method of claim 1, wherein, before the step of submitting the compliance filing populated with data to the first regulatory authority, the method further comprises:
   providing, using the computer hardware processor, the compliance filing, as determined by the first statistical model and as populated by the second statistical model, to a party at the organization for approval; and
   receiving approval from the party to file the compliance filing with the first regulatory authority.

4. The method of claim 3, wherein, after the compliance filing has been submitted to the first regulatory authority, the method further comprises:
   updating, using the computer hardware processor, the database and the first statistical model and the second statistical model with information relating to the approval received from the party at the organization.

5. The method of claim 1, wherein, before the step of submitting the compliance filing populated with data to the first regulatory authority, the method further comprises:
providing the compliance filing to a party at the organization for approval; and
receiving a corrected version of the compliance filing to be filed with the first regulatory authority.

6. The method of claim 5, wherein, after the step of submitting the compliance filing, the method further comprises:
updating the database with data relating to the corrected version of the compliance filing; and
updating the first statistical model and the second statistical model with data relating to the corrected version of the compliance filing.

7. The method of claim 1, after the step of determining an appropriate compliance filing, further comprises:
determining, using the GPU to run the first statistical model or the second statistical model based on data stored in the database and data found in the second document, a regulatory authority which is appropriate to receive the compliance filing;
wherein the first statistical model or the second statistical model determines which regulatory authority is appropriate to receive the compliance filing.

8. A method for enhancing compatibility of a document with a database of an organization to facilitate use of statistical models, the method comprising:
receiving, at a computer hardware processor, where the database is stored on a computer server and the statistical models are based on contents of the database, to automate a submission of compliance filings with a regulatory authority, a first set of documents comprising two or more documents in a first format, the first format comprising a digital representation of a picture, a scan, or a facsimile, said first format comprising a format that the computer hardware processor cannot use to extract data to populate the database, said first set of documents are stored on a computer server;
converting, using the computer hardware processor to perform optical character recognition (OCR), the first set of documents from the first format into a second format, the second format comprising a format that the computer hardware processor can use to extract data from a document;
accessing, using the computer hardware processor, a first set of compliance filings with a regulatory authority comprising two or more compliance filings in the second format from the computer server, where the database is stored on a computer server and the statistical models are based on contents of the database, to automate a submission of a compliance filing with regulatory authority;
populating, using the computer hardware processor, the database on the computer server with data extracted from the first set of documents in the second format and the first set of compliance filings in the second format;
training, using a graphics processing unit (GPU) and the database, a first statistical model, the first statistical model comprising a deep learning artificial intelligence (AI) system, to determine a type of compliance filing to file based on the first set of documents and the first set of compliance filings with a regulatory authority;
training, using the GPU and the database, a second statistical model based on a receipt of a document, the second statistical model comprising a deep learning AI system, to, after receiving the type of compliance filing from the first statistical model, populate a compliance filing;
receiving, at the computer hardware processor, a second document from an entity, where the second document is populated with data;
converting, using the computer hardware processor to perform OCR, the second document into the second format, when the second document is in the first format;
running, using the GPU and the second document, the first statistical model to determine the type of compliance filing to file;
using the type of compliance filing to file as determined by the first statistical model, running, using the GPU and the second document, the second statistical model to populate a compliance filing for submission to a first regulatory authority; and
submitting to the first regulatory authority, using the computer hardware processors, the compliance filing populated with data;
wherein:
the second document and the compliance filing relate to an application for a product or a service by the entity to the organization.

9. The method of claim 8, wherein:
data used to populate the database from the first set of documents in the second format includes metadata associated with the first set of documents.

10. A system for enhancing compatibility of a document with a database of an organization to facilitate use of statistical models, the system comprising:
a computer hardware processor, where the database is stored on a computer server and the statistical models are based on contents of the database, to automate a submission of compliance filings with a regulatory authority;
a graphics processing unit (GPU); and
a non-transitory computer-readable storage medium storing processor-executable instructions that, when executed by the computer hardware processor, cause the computer hardware processor to perform:
receiving, at the computer hardware processor, a first set of documents comprising two or more documents in a first format, the first format comprising a format that the computer hardware processor cannot use to extract data, said first set of documents are stored on a computer server;
converting, using the computer hardware processor to perform optical character recognition (OCR), the first set of documents from the first format into a second format, the second format comprising a format that the computer hardware processor can use to extract data from a document;
accessing, using the computer hardware processor, a first set of compliance filings with a regulatory authority comprising two or more compliance filings in the second format from the computer server, wherein the first set of compliance filing relates to a submission of the first set of documents by an entity to an organization and the first set of documents is in a format that is poorly compatible with a database of the organization;
populating, using the computer hardware processor, the database on the computer server with data extracted from the first set of documents in the second format and the first set of compliance filings in the second format, where the database is stored on the computer server;

training, using the GPU and the database, a first statistical model, the first statistical model comprising a deep learning artificial intelligence (AI) system, to determine a type of compliance filing to file based on the first set of documents and the first set of compliance filings with a regulatory authority;

training, using the GPU and the database, a second statistical model based on a receipt of a document, the second statistical model comprising a deep learning AI system, to, after receiving the type of compliance filing from the first statistical model, populate a compliance filing;

receiving, at the computer hardware processor, a second document from an entity, where the second document is populated with data;

converting, using the computer hardware processor to perform OCR, the second document into the second format;

running, using the GPU and the second document, the first statistical model to determine the type of compliance filing to file;

using the type of compliance filing to file as determined by the first statistical model, running, using the GPU and the second document, the second statistical model to populate a compliance filing for submission to a first regulatory authority; and submitting to the first regulatory authority, using the computer hardware processor, the compliance filing populated with data;

wherein:
the second document and the compliance filing relate to a return of a product or cancelation of a service received from the entity to the organization.

11. The system of claim 10, wherein:
data used to populate the database from the first set of documents in the second format includes metadata associated with the first set of documents.

12. The system of claim 10, wherein, before the step of submitting the compliance filing populated with data to the first regulatory authority, the system further comprises:
providing, using the computer hardware processor, the compliance filing, as determined by the first statistical model and as populated by the second statistical model, to a party at the organization for approval;
receiving approval from the party to file the compliance filing with the first regulatory authority; and
updating the database and the first statistical model and the second statistical model with information relating to the approval received from the party at the organization.

13. The system of claim 10, wherein, before submitting the compliance filing populated with data to the first regulatory authority, the system further comprises:
providing the compliance filing to a party at the organization for approval;
receiving a corrected version of the compliance filing to be filed with the first regulatory authority; and
updating the database and the first statistical model and the second statistical model with information relating to the corrected version of the compliance filing.

14. The system of claim 10, wherein, after determining an appropriate compliance filing, the system further comprises:
determining, using the GPU to run the first statistical model or the second statistical model, based on data stored in the database and data found in the document, a regulatory authority which is appropriate to receive the compliance filing.

* * * * *